UNITED STATES PATENT OFFICE.

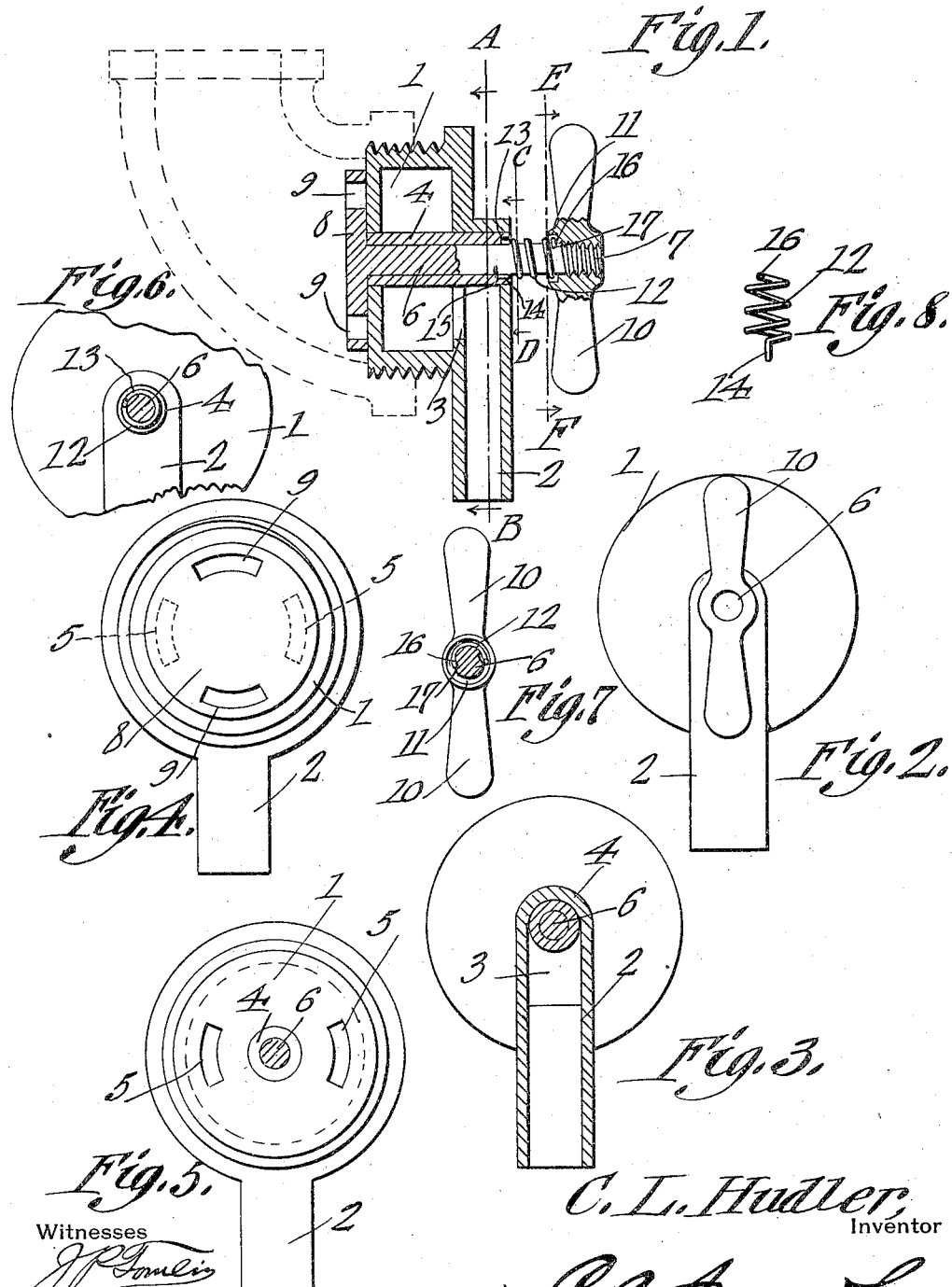
C. L. HUDLER.
VALVE.
APPLICATION FILED JULY 26, 1915.
1,179,834.
Patented Apr. 18, 1916.
C. L. Hudler, Inventor

CHARLES L. HUDLER, OF ST. LOUIS, MISSOURI.

VALVE.

1,179,834.  Specification of Letters Patent.  Patented Apr. 18, 1916.

Application filed July 26, 1915. Serial No. 41,973.

*To all whom it may concern:*

Be it known that I, CHARLES L. HUDLER, a citizen of the United States, residing at the city of St. Louis, in the State of Missouri, have invented a new and useful Valve, of which the following is a specification.

This invention relates to a combined valve and nozzle attachment for service pipes and the like, one of the objects of the invention being to provide, as a complete article, a discharge spout or nozzle carrying a valve of novel form and which device is adapted to be attached readily to service pipes and other fluid containers.

A further object is to provide a valve which does not require the use of gaskets or the like to prevent leakage and which constitutes a self grinder so that a tight joint is always insured.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

In the accompanying drawings the preferred form of the invention has been shown.

In said drawings:—Figure 1 is a central vertical section through the combined nozzle and valve constituting the present invention, the same being shown in engagement with an elbow which is illustrated in dotted lines. Fig. 2 is a front elevation of the device. Fig. 3 is a section on line A—B Fig. 1. Fig. 4 is a rear or inner elevation of the device. Fig. 5 is a similar view with the valve disk removed and its stem shown in section. Fig. 6 is a section on line C—D Fig. 1. Fig. 7 is a section on line E—F Fig. 1. Fig. 8 is a detail view of the spring used in connection with the valve.

Referring to the figures by characters of reference 1 designates a hollow screw plug provided, upon its outer face, with a nozzle 2 extending radially therefrom and partly thereacross, the outer end of the nozzle being open, while the inner end is closed. A port 3 establishes communication between the nozzle and the interior of the screw plug and arranged axially within the screw plug is a tubular core 4 which extends through the nozzle and has one end flush with the front face of the nozzle, while its other end is flush with the back face of the screw plug. Opposed ports 5 are formed within the back or inner face of the plug 1. Mounted for rotation within the core 4 is a valve stem 6 preferably screw threaded at one end, as shown at 7 while its other end carries a valve disk 8 having flat faces and provided with opposed ports 9. One flat face of the disk 8 engages the flat inner face of the screw plug 1 and when the valve is in closed position, the ports 9 lie between the ports 5, as shown in Fig. 4. However, when it is desired to turn the valve to open position, the ports 9 will move into register with the ports 5. As the coacting faces of the screw plug and the valve disk are flat and smooth, it will be apparent that when the two faces are pressed together, leakage will be prevented. Furthermore when the valve is turned while in contact with its seat, both the valve and the seat will be ground, thus insuring at all times a tight fit between the parts.

The threaded end 7 of the stem 6 is engaged by a handle 10 having a central recess 11 in the inner portion thereof for the reception of one of the end convolutions of the coiled spring 12 which is mounted on stem 6. The other end convolutions of this spring is seated within a recess 13 formed in the adjacent end of the core 4. One end of the spring 12 has a finger 14 extending longitudinally therefrom and into a notch 15 in the core 4, while the other end of the spring is inturned, as shown at 16 so as to become seated in a notch 17 formed in the periphery of the stem 6. One or more of these notches can be provided as shown, and they are so shaped that when the stem is rotated in one direction, the notch or notches will pass under said inwardly bent end 16, while the spring remains stationary. However, when the stem 6 is rotated in the opposite direction, one wall of one of the notches will come against said inturned end 16 and thus serve as a stop to prevent rotation of the stem. Consequently should an effort be made to rotate the stem 6 backwardly, it would be held and continued effort would result in the handle 10 unscrewing from the stem. Thus it will be seen that it becomes possible to rotate the stem 6 in only one direction and, as a result, there is no danger of roughening the active inner face or valve seat of the screw plug 1 such as would result should it be possible to rotate the valve back and forth. When the ports 9 are in register with the ports 5, fluid is free to pass through the valve and the plug 1 to the spout or nozzle 2 whereas, when the said ports are out of register, passage of fluid through the plug 1 is cut off. Obviously the plug 1 can be placed readily in position within the end of a pipe, an elbow or the like, and it constitutes an article complete in itself to be sold to the trade for various uses to which it may be put.

What is claimed is:—

1. A device of the class described including a hollow screw plug having an inlet and an outlet, a nozzle integral with the outer end of the screw plug and adapted to receive fluid from the outlet, a tubular core extending through the screw plug, a stem mounted for rotation in the core, a valve revoluble with the stem, there being a port in the valve movable into and out of register with the inlet of the plug, yielding means upon the stem for holding the valve normally pressed against its seat, said means coöperating with the stem for holding the stem against rotation in one direction.

2. A device of the class described including a hollow screw plug having an inlet port in one end and an outlet port in its other end, a nozzle integral with the outer end of the screw plug and adapted to receive fluid from the outlet port, a tubular core extending through the screw plug and nozzle, a stem mounted for rotation in said core, a valve disk revoluble with the stem and having a flat face coöperating with the inner end of the screw plug, there being a port within the disk movable into and out of register with the inlet port of the screw plug, yielding means upon the stem for holding the valve disk normally pressed against the adjacent end of the screw plug, said means coöperating with the stem for holding the stem against rotation in one direction.

3. The combination with a hollow screw plug having a radial nozzle upon the outer end thereof, an inlet port in the inner end of the screw plug and an outlet port in the outer end of the plug and opening into the nozzle, of a tubular core mounted centrally within the plug, a stem mounted for rotation within the core and having a notch, a valve disk revoluble with the stem and having a port therein movable into and out of register with the inlet port in the screw plug, said disk and the inner end of the screw plug having flat coöperating faces, a handle detachably connected to the stem, there being a recess within the inner face of the handle and within the outer end of the core, a coiled spring upon the stem, a finger extending from one end of the spring and into engagement with the core, the ends of the spring being seated within the respective recesses, one end of said spring coöperating with the notch in the stem to hold the stem against rotation in one direction.

In testimony that I claim the foregoing as my own, I have hereto affixed my signature in the presence of two witnesses.

CHARLES L. HUDLER.

Witnesses:
Ivy E. Simpson,
Philomena A. Rockelli.

Copies of this patent may be obtained for five cents each, by addressing the "Commissioner of Patents, Washington, D. C."